(12) United States Patent
Lorenzo Noguera

(10) Patent No.: US 11,980,198 B2
(45) Date of Patent: May 14, 2024

(54) CLIP FOR CLOSING SAUSAGE CASINGS BY CONSTRICTION

(71) Applicant: Sagar Lorenzo Noguera, Mataro (ES)

(72) Inventor: Sagar Lorenzo Noguera, Mataro (ES)

( * ) Notice: Subject to any disclaimer, the term of this patent is extended or adjusted under 35 U.S.C. 154(b) by 337 days.

(21) Appl. No.: 17/435,137

(22) PCT Filed: Feb. 18, 2020

(86) PCT No.: PCT/ES2020/070114
§ 371 (c)(1),
(2) Date: Aug. 31, 2021

(87) PCT Pub. No.: WO2020/178463
PCT Pub. Date: Sep. 10, 2020

(65) Prior Publication Data
US 2022/0132870 A1    May 5, 2022

(30) Foreign Application Priority Data

Mar. 5, 2019 (EP) .................................... 19382165

(51) Int. Cl.
*A22C 11/12* (2006.01)
*B65D 33/16* (2006.01)

(52) U.S. Cl.
CPC ........ *A22C 11/125* (2013.01); *B65D 33/1641* (2013.01)

(58) Field of Classification Search
CPC . A22C 11/125; B65D 33/1641; Y10T 24/152; Y10T 24/15; B65B 51/04
See application file for complete search history.

(56) References Cited

U.S. PATENT DOCUMENTS

| | | | | |
|---|---|---|---|---|
| 2,972,791 A | * | 2/1961 | Kelem | B65D 33/1641 24/30.5 W |
| 3,022,571 A | * | 2/1962 | Niedecker | B65D 33/1641 428/572 |
| 3,343,253 A | * | 9/1967 | Omori | B65B 51/04 29/243.57 |

(Continued)

FOREIGN PATENT DOCUMENTS

EP  0 081 250 A1   6/1983
EP  0 337 301 A1  10/1989

(Continued)

OTHER PUBLICATIONS

European Search Report for EP 19382165 dated Jul. 19, 2019.

(Continued)

*Primary Examiner* — Jonathan Malikasim
*Assistant Examiner* — Rowland Do
(74) *Attorney, Agent, or Firm* — Sughrue Mion, PLLC

(57) ABSTRACT

A clip suitable for the constriction of sausage casings, the clip having a general U-shaped configuration with two facing legs that are bent with respect to a base of the clip. The base of the clip is divided so as to determine in the same two or more joining bridges between the legs. These joining bridges are spaced apart and the ends thereof converge at the aforementioned legs. Between the bridges one or several creases or folds of the casing can be at least partially housed when the clip tightly clasps the casing.

14 Claims, 6 Drawing Sheets

(56) References Cited

U.S. PATENT DOCUMENTS

| | | | | |
|---|---|---|---|---|
| 4,200,962 | A * | 5/1980 | Niedecker | B65D 33/1641 24/30.5 W |
| 4,308,641 | A * | 1/1982 | Niedecker | B65D 33/1641 24/30.5 W |
| 5,218,742 | A * | 6/1993 | Sleven | B65D 33/1641 24/30.5 R |
| 5,247,723 | A * | 9/1993 | Niedecker | B65D 33/1641 24/30.5 W |
| 5,852,850 | A * | 12/1998 | Hanten | B65D 33/1675 24/30.5 R |
| 5,953,794 | A * | 9/1999 | Hanten | B65D 33/1641 24/30.5 R |
| 7,571,518 | B2 * | 8/2009 | Davidson | B65D 33/1616 24/30.5 R |
| 7,666,073 | B2 * | 2/2010 | Schleucher | B65D 33/1641 452/48 |
| 8,122,571 | B2 * | 2/2012 | Schoenmaker | B65D 33/1641 24/30.5 R |
| 2006/0235468 | A1 * | 10/2006 | Huitema | A61B 17/064 606/219 |

FOREIGN PATENT DOCUMENTS

| | | |
|---|---|---|
| EP | 0 738 662 A1 | 10/1996 |
| EP | 1 845 026 A1 | 10/2007 |

OTHER PUBLICATIONS

International Search Report for PCT/ES2020/070114 dated Jul. 17, 2020 (PCT/ISA/210).

Written Opinion for PCT/ES2020/070114 dated Jul. 17, 2020 (PCT/ISA/237).

* cited by examiner

FIG. 1: STATE OF THE ART
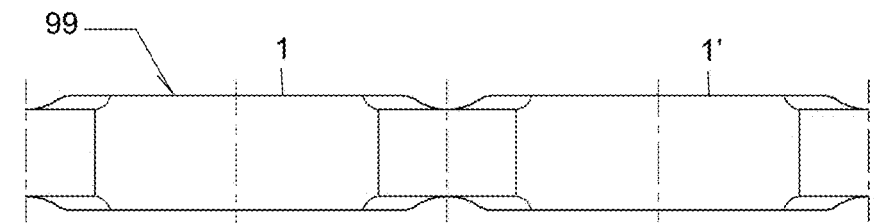
Fig. 1a
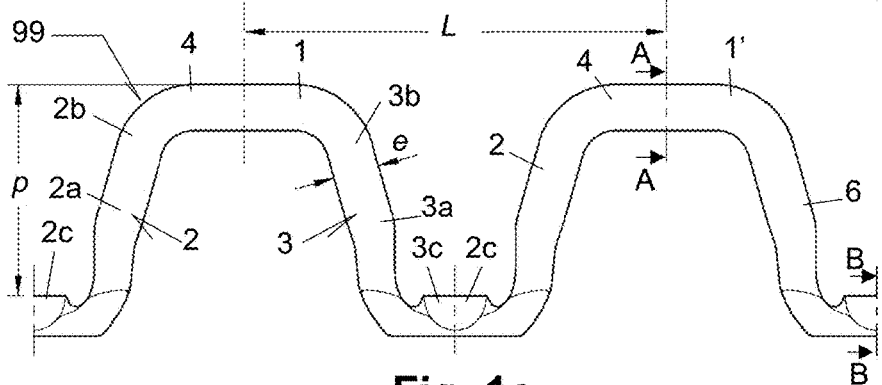
Fig. 1c
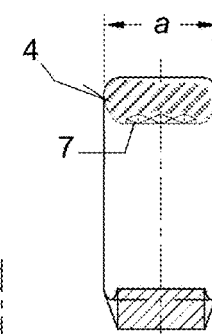
Fig. 1b
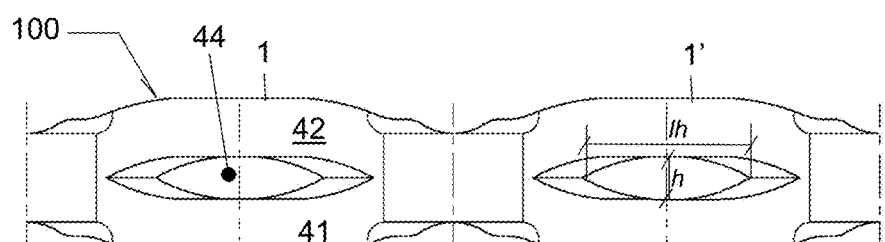
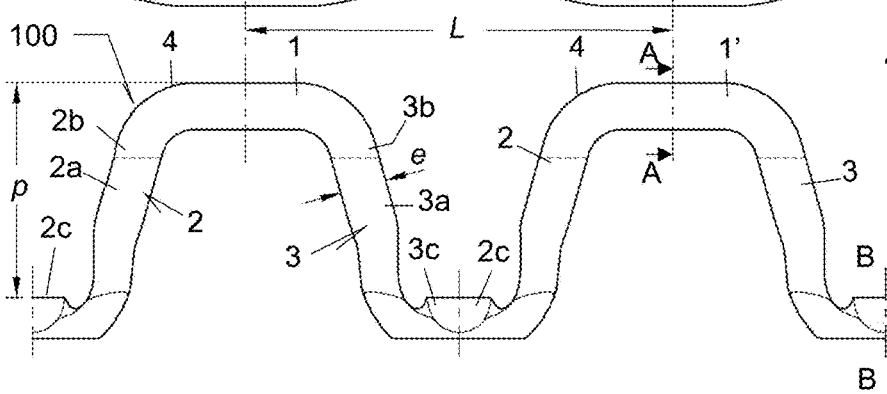
Fig. 2c
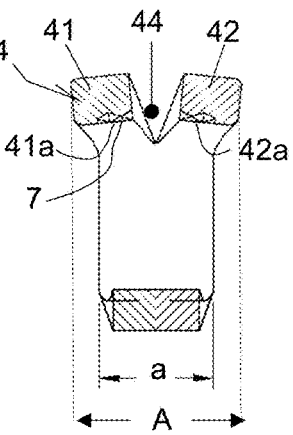
Fig. 2a
Fig. 2b

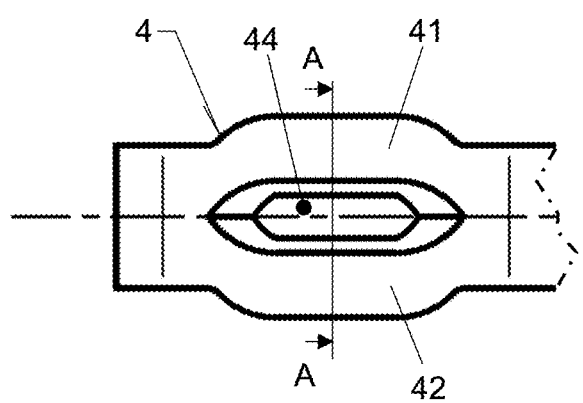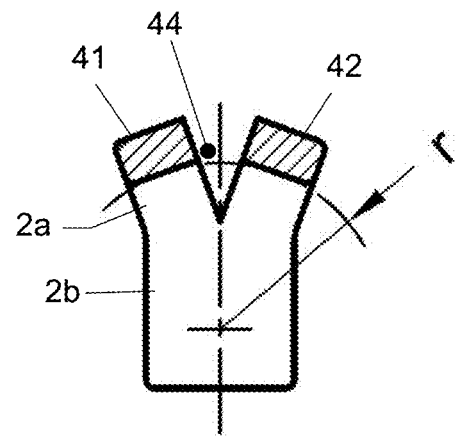
Fig. 4a Fig. 4b
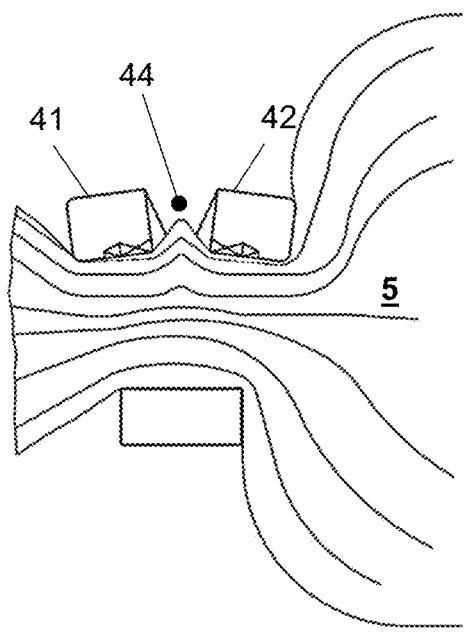
Fig. 5

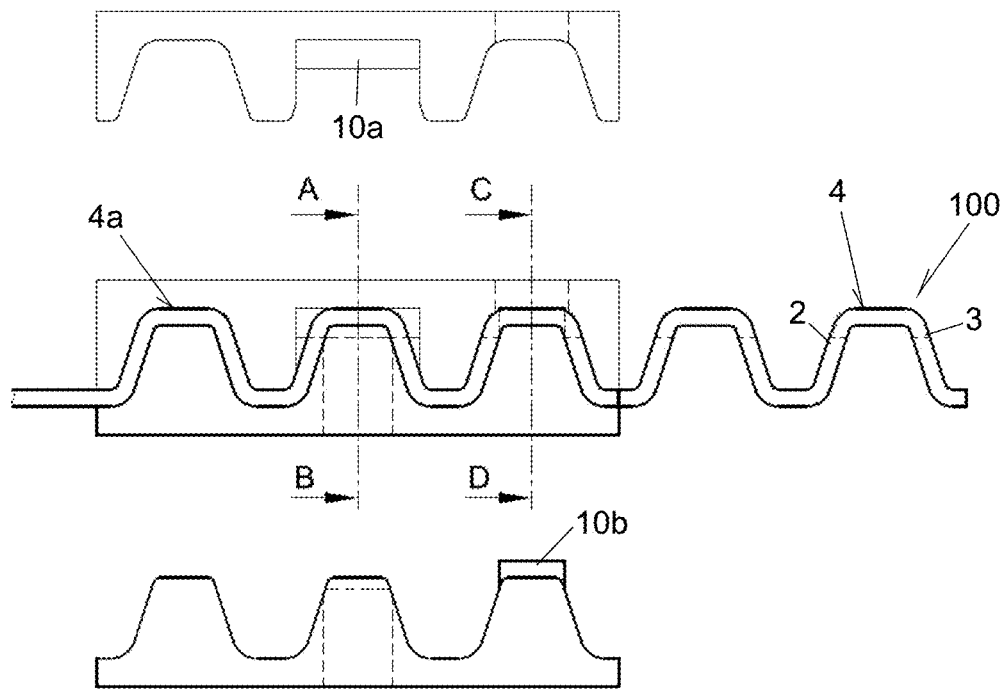
Fig. 6a
Cut A-B                Cut C-D
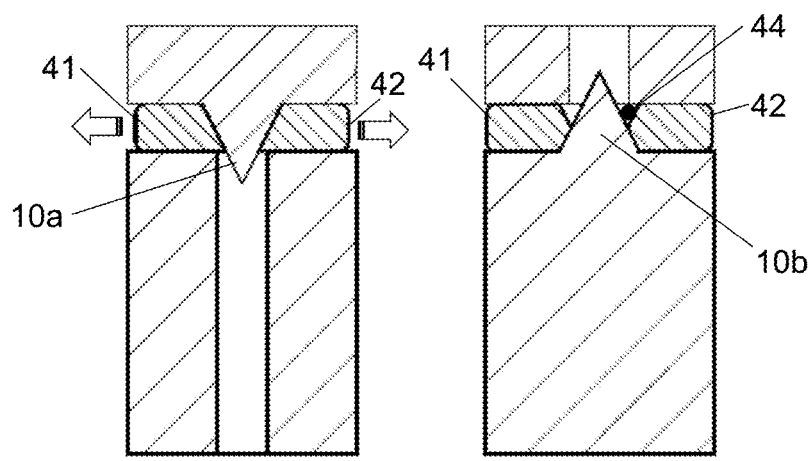
Fig. 6b          Fig. 6c

CLIP FOR CLOSING SAUSAGE CASINGS BY CONSTRICTION

CROSS REFERENCE TO RELATED APPLICATIONS

This application is a National Stage of International Application No. PCT/ES2020/070114 filed Feb. 18, 2020, claiming priority based on Spanish Patent Application No. 19382165.9 filed Mar. 5, 2019.

TECHNICAL FIELD OF THE INVENTION

The invention relates to a clip that is especially suitable for closing synthetic casings in the shape of a tube or bag, filled with meat for the production of sausages. The invention also relates to a concatenation and a strip of these clips.

BACKGROUND OF THE INVENTION

The use of clips having a general U-shaped configuration made from a material in the form of a strip or wire for sealing constricted or twisted ends of laminated tubular bags or casings is widely known and applied in the sausage casing sector, for example, for sealing casings that are full of sausage meat.

These clips have two facing legs and a connection bridge between said legs. For the application of said clips, clipping mechanisms are used that conventionally comprise an anvil, against which the aforementioned clips are crushed and the legs thereof formed into a seal around an empty portion of the bag or encasing to be sealed, which is tightly held and clasped by the clip.

In the aim of perfecting this fastening and achieving a greater resistance to the slipping of the clip with respect to the bag or casing, several variants of clips provided with anti-slip means have been disclosed.

Thus, for example, patent document EP0081250 proposes providing the inner face of the bridge of the clip and both transition zones between said bridge and the legs with a reinforcement rib which, on the one hand, increases the mechanical resistance to the tendency of the clip to open by unfolding and, on the other hand, additionally increases the resistance thereof to slippage. This solution is especially useful in the case of the use of plastic casings or fibrous casings coated with a synthetic material.

Another option is that which is described in document EP0738662, according to which the sealing clips have one or several grooves on the inner face thereof in a longitudinal direction of the strip of material that said clips are made from, with the purpose of reducing the risk of slippage.

However, as pointed out in patent document EP0337301, it has been shown that this does not allow for a more secure fastening to be achieved, which could be due to the fact that the groove acts as a lubrication sack. This situation is further complicated by the fact that the edges of the sealing clips that act on the sausage casing must be well rounded, which is well known, in order to prevent damage to the casing. Due to this fact, EP0337301 aims to improve the adhesion capability of the sealing clips by using a solution that is different from the use of grooves like the ones envisaged in EP0738662.

Document EP0337301 discloses sealing clips that have on the inner face of the legs of the clip, as well as on the bridge of the clip, a plurality of grooves, arranged crossing over one another and essentially covering the entire surface. The knurled patterns that are formed in this way have a greater surface roughness with respect to the longitudinal grooves of EP0738662 and further reduce the risk of slippage.

The best effect of the clips made according to the proposal of EP 0337301 would be based not only on the fact that a greater number of edges are arranged on the support surface that collaborate with the casing, but also on the fact that these edges can be sharper. In other words, the closer the recesses are to one another and the smaller the width of each one of the recesses, the lower the risk that each one of the edges will dangerously penetrate to a depth at which it has a cutting effect on the surface of the sausage casing, without the improved effect of the friction achieved by means of the sharp edges being detrimental. Furthermore, the improvement achieved according to EP0337301 could also be related to the fact that a drainage effect is achieved, by means of which the lubricants that worsen the slippage effect are expelled by pressure, pushed by the support pressure, such that the contact between the solid bodies of the clip and the casing is increased.

Other solutions combine teachings of the previously mentioned patent documents.

Patent document EP1845026 provides that the material in the form of a strip or wire from which the clips are obtained, in the area of the bridge of the clips, is perforated towards the inside in relation to the U shape. This perforation produces raised material on the inner face of the clip that includes a raised material edge.

This characteristic is combined with the inclusion of stamped slits, centred in relation to the plane of the clip, on the inner faces of the legs of the clip, comparable to the grooves claimed by EP0337301.

The raising of the material in the area of the hole would, according to EP1845026, increase the occasional pressure load of the clip on the casing and, therefore, the adherent friction of the sealing clip. However, as shown by EP1845026, the formation of the raised material edge is harmless, especially on packaging materials that have a high tear strength, which means that it is not suitable for all other types of materials.

A first objective of the present invention is a versatile clip, which can be applied to a wide variety of casings, and not only to ones which have a high tear strength, further improving resistance to slippage in comparison with existing clips which, lacking raised material, teeth or similar towards the inside of the clip, are the only ones suitable for casings that do not have a high tear strength.

Another objective of the present invention is a clip that achieves these objectives without requiring more material per clip unit for the achievement of the same, or which, requiring less material, can achieve the same features in relation to clips of prior art.

DESCRIPTION OF THE INVENTION

The clip according to the invention is a clip according to claim 1.

Said clip is suitable for closing by means of the constriction of casings for food products and especially sausage casings or similar, the clip having a general U-shaped configuration comprising two facing legs that are bent with respect to a base of the clip. The clip can also serve as a closure for casings that contain other types of products that are not food products, such as cementitious, silicone, or other similar products. The casings can be in the shape of a tube or bag or have different configurations.

In essence, the clip is characterised in that said base of the clip is divided so as to determine in the same two or more joining bridges, between the legs, spaced apart and the ends of which converge at the aforementioned legs, between the said bridges one or several creases or folds of the casing can be at least partially housed when the clip tightly clasps around said casing.

These folds promote a locking effect, precisely when the clip tends to move with respect to the casing, a situation which requires that the fastening of the clip on the casing be guaranteed.

In one embodiment, the separation between two joining bridges has a width dimension (h), along at least half of the length (lh) thereof, from 0.1 mm to 2.5 mm. The optimum width, as will be explained further below, will be based on parameters that are not directly related to the clip, such as the type of casing and the material thereof, the thickness of the same, etc.

In a variant of interest, wherein the clip is of metal, the joining bridges have been formed by the splitting or mechanical separation of a single original base of the clip, allowing at least a punch tool in the shape of a wedge to be able to penetrate the material of which the aforementioned original single base of the clip is made up, dividing it and separating portions of the base from one another so as to determine respective joining bridges one at each side of the punch tool, the base of the clip expanding as a result thereof in relation to the original single base.

This expansion is not the result of using more material, but rather it is the result of expanding the original base during an operation of division and separation.

Preferably, in the splitting of the original single base, penetration is made in the original single base by a first and a second punch tool, each one from one of the faces of the aforementioned single base, the inner face aimed towards the legs and the outer face aimed towards the outside, preventing a raised material or the formation of burrs that project from said faces towards the inside and towards the outside of the clip, respectively.

Advantageously, the formation of serrated edges, spikes or sharp protrusions or of any nature that could perforate the casing when the clip hugs the same is prevented.

According to a variant of the invention, each joining bridge, on the inner face thereof and aimed towards the legs of the clip, determines a support surface intended to be applied against the casing during the use of the clip, these support surfaces of each bridge not being coplanar with one another due to the effect of separation produced by the penetration of the tool or, if applicable, punch tools used to form these joining bridges.

Preferably, these support surfaces of the joining bridges determine a support, interrupted by the separation between the joining bridges, concave with respect to the inside of the clip.

According to a variant of the invention, regardless of the way of the clip is obtained, the space that separates two joining bridges defines an opening in the base with an essentially rectangular contour, with the longer sides being parallel and the smaller sides in a circumferential arc and convex towards the inside of the aforementioned opening.

Said opening has a width dimension (h) that varies based on the use the clip is intended for and can be comprised between 0.1 mm and 2.5 mm.

The clip of the invention is compatible with known solutions for automating the supply thereof, which usually involves supplying a magazine of non-individual clips in the form of a concatenation or strip.

Furthermore, also disclosed is a concatenation of clips according to the present invention, formed by the joining without interruption of the aforementioned clips, each clip being joined to a clip that is immediately before it and to a clip that is immediately after it by connection extensions formed on the distal ends of the legs, aimed toward the outside of the clip and forming an angle with respect to the main direction of said legs.

Likewise, also disclosed is a strip of clips according to the invention, which comprises a succession of said clips juxtaposed at the bridge thereof and related to each other in a separable way by means of a fastening element or fastening means that are flexible and able to be cut by a shear.

BRIEF DESCRIPTION OF THE DRAWINGS

FIGS. 1a to 1c show a portion of a concatenation of clips, specifically corresponding to two consecutive clips, which are examples of the current state of the art
   in FIG. 1a, according to a plan view
   in FIG. 1b, in cross section according to the cutting planes AA and BB of FIG. 1a.
   in FIG. 1c, according to a side view.

FIGS. 2a to 2c show a portion of another concatenation of clips, specifically corresponding to two consecutive clips, but in this case according to a first variant of the present invention
   in FIG. 2a, according to a plan view
   in FIG. 2b, in cross section according to the AA and BB cutting planes of FIG. 2a.
   in FIG. 2c, according to a side view.

FIGS. 4a and 4b show a clip according to a second embodiment of the invention in a plan view and in cross section according to the AA cutting plane of FIG. 4a, respectively;

FIG. 5, schematically and in longitudinal cross section with respect to a stuffed product, shows a clip according to the first embodiment of the invention closed around an empty end of the casing of said product;

FIGS. 6a, 6b and 6c schematically illustrate a method for obtaining a clip according to the present invention;

DETAILED DESCRIPTION OF THE INVENTION

Figure 3A:
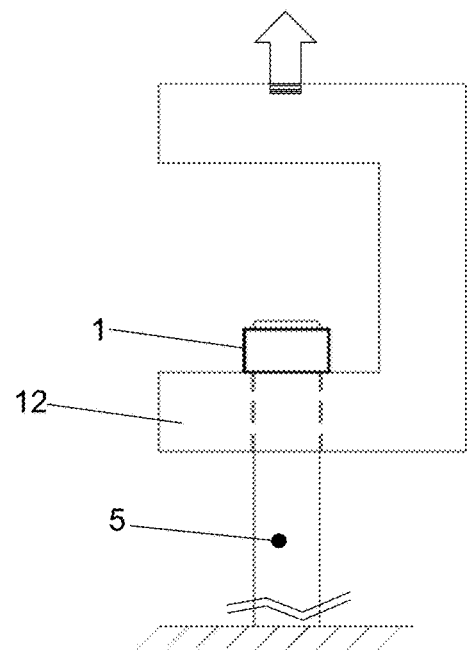
FIG. 3a schematically shows a method used for empirically determining the tensile strength provided by tested clips, in other words the resistance provided before slipping over the casing they clasp, disabling the closure of the same.

The features and advantages of a clip according to the present invention are understood based on comparative tests with a clip exemplifying the current state of the art.

FIGS. 1a to 1c show a concatenation 99 of known clips, while FIGS. 2a to 2c show a similar concatenation 100, but of clips according to a first variant of the invention. In both concatenations 99 and 100, the same reference numbers will be used for designating common characteristics.

Both concatenations 99 and 100 are obtained from material in the form of a continuous strip or wire, for example of aluminium material, stamping the strip-like or wire-type material into an essentially undulated profile, determining a series of clips able to be individualised by a transverse cut of the aforementioned strip or wire. Specifically, alternating peaks and valleys are distinguished, each peak determining a base area 4 of a clip 1, 1'; and each valley determining a connection area between each two consecutive clips.

Legs 2, 3 extend on both sides of the base area 4 of each clip, the ends of said legs being bent in an opposite direction determining connection extensions 2c, 3c, by means of which one clip 1 is joined without interruption to a clip that is immediately before 1' the same and to a clip that is immediately after the same (not shown).

This type of concatenation is of interest because, in a known way, it is able to be rolled around the core of a spool for the automatic supply of clips, for example, for a stapling mechanism.

In the examples selected, the starting strip has an essentially rectangular transverse cross section with a thickness e of 2 mm and a width a of 5 mm. The aforementioned connection extensions 2a, 3c, however, have been conformed to alter said rectangular transverse cross section and adopt a variable cross section, which in itself is known, in order to facilitate the cutting operation of the strip and individualise the successive clips 1', 1.

In these examples, the length L of each clip is 18 mm, the height p thereof, measured from the highest point of the connection extensions 2c, 3c, being 9 mm.

The strip can also be machined on the inner face thereof, providing the base areas 4 of both concatenations 99 and 100 with a plurality of grooves 7, arranged crosswise with respect to one another, to artificially increase the surface roughness thereof and, as has been proven in the state of the art, improve the resistance thereof to slippage in comparison with other clips without this type of finishing when the clip clasps a casing. This was the case for tested clips.

In the concatenation 100 of clips 1 according to the present invention, illustrated in FIGS. 2a to 2c, the base 4 is divided, determining two joining bridges 41, 42 between the legs 2, 3 in the example. These joining bridges 41, 42 are spaced apart with respect to one another, the ends thereof converging at the aforementioned legs 2, 3.

In these clips 1 that exemplify the invention, illustrated in FIGS. 2a to 2c, the base area 4 is thus split, providing a sort of double-clip, although only in the area that concerns the base of the same, preserving the original shape of the legs 2, 3. In fact, as will be described in greater detail below, the clips of FIGS. 2a to 2c are preferably obtained by subjecting the original single bases to an operation of division which, among other results, produces an expansion of the width A of the clip 1 in the base 4 area of the same (see FIG. 2b). This increase in the width is achieved without the use of more material of the strip, in the example, without more aluminium.

In the embodiment shown in FIGS. 2a to 2c, the space that separates the two joining bridges 41, 42 defines an opening 44 with an essentially rectangular contour, with the longer sides being parallel and the smaller sides being in a circumferential arc and convex towards the inside of the aforementioned opening. Said opening 44 has a width h of approximately 1.8 mm, and a length dimension lh similar to the length of the base area 4 of the clip 1, meaning approximately 5.5 mm.

Note that the legs 2, 3 have a straight main portion 2a, 3a, each one of said portions connected to the base 4 of the clip by means of a curved transition zone 2b, 3b, and the separation between the joining bridges extends throughout the entire base 4 of the clip, reaching said curved transition zones 2b, 3b.

As stated previously, in a preferred, however non-exclusive way, and as schematically shown in FIGS. 6a, 6b and 6c, the joining bridges 41, 42 in each clip 1 have been formed by the splitting or mechanical separation of a single original base 4a of the clip, allowing tools 10a, 10b in the shape of a wedge to be able to penetrate the material of which the aforementioned original single base 4a of the clip is made up, dividing it and separating portions of the base so as to determine the joining bridges 41, 42 one at each side of the tools 10a, 10b, the base of the clip expanding as a result thereof in relation to the original single base 4a. This expansion is evident in FIG. 2b, which shows the base 4 areas of an effective width A of the clips 1 greater than the width a of the clips of FIGS. 1a to 1c, representative of the current state of the art, having obtained the two clip models, the one that exemplifies the state of the art and the one that exemplifies a variant of the invention, from a similar band of material. Likewise, this expansion effect is also indicated by the arrows in FIG. 6b.

It is noteworthy to mention that in the splitting of the original single base 4a, tools 10a, 10b penetrate from the two faces of the aforementioned single base 4b, the inner face aimed towards the legs 2, 3 and the opposite outer face aimed towards the outside, preventing raised material and the formation of burrs projecting from said faces towards the inside and towards the outside of the clip 1, respectively.

FIG. 6a illustrates a process to follow for putting this splitting into practice. Conventionally one begins with material in the form of a continuous strip or wire, stamping the strip-like or wire-type material into an essentially undulated profile, determining a series of clips able to be individualised by a transverse cut of the aforementioned strip or wire. The peaks, which alternate with the valleys, determine the single base areas 4a of each clip.

In the process illustrated, in each blow of the machine, the strip stamped in this way advances a position, each stamped clip being arranged successively, first in the area of influence of a first punch tool 10a and then in the area of influence of a second punch tool 10b.

The first and the second punch tool 10a and 10b are formed or arranged in the stamping dies. In the example, the first punch tool 10a is formed in the upper stamping die and the second punch tool 10b is formed in the lower stamping die. In correspondence with these punch tools 10a and 10b, the facing stamping dies have an opening or hole that is suitable for accommodating said punch tools when the dies close on each other.

The interaction of each punch tool with the body of the clip being formed is shown in greater detail in FIGS. 6b and 6c. It is worth noting that the use of two punch tools avoids the formation of burrs that can extend from the mouths of the opening formed toward the outside, which is important for protecting the casing when the clip is closed over the same, and also for the user, either during the handling of the clip load or during the handling of the product to be made with the clip applied to the casing.

As a result, each joining bridge 41, 42 of the base area 4 of the clip, on the inner face thereof, aimed towards the legs 2, 3 of the clip, determines a support surface 41a, 42a aimed at being applied against the casing during the use of the clip, these support surfaces 41a, 42a lacking raised material or sharp edges that can split or break the casing.

In the example of FIGS. 2a to 2c, these support surfaces 41a, 42a intended to be applied against the casing during the use of the clip are not coplanar to one another due to the effect of separation produced by the penetration of the tool used for the formation of the joining bridges 41, 42. The convergence of the joining bridges 41 and 42 at the legs 2 and 3, immobilised during the expansion operation or splitting of the base area of the clip, can cause a slight shift or turn of the joining bridges 41, 42 in opposite directions.

The selection of the profile of the punch tools 10a, 10b used and of the dies allow this turning to be modulated, being able to achieve turns that are more or less sharp or even not allowing said turn.

Figure 11:
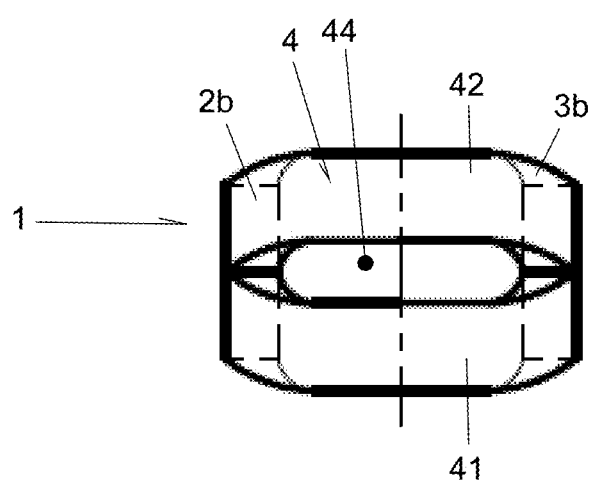
FIG. 11 is a plan view of one of the clips of the strip of FIG. 10.

Thus, for example, on the one hand FIGS. 2b and 4b exemplify two different embodiments for a clip 1 according to the invention, which in essence are different in the degree of separation between the joining bridges 41 and 42 and in the relative orientation of the same, the joining bridges 41, and 42 having turned to a greater degree in the example of FIG. 4b in comparison with the example of FIG. 2b; and, on the other hand, the invention also envisages providing means for preventing this turning of the joining bridges 41 and 42 during a possible splitting operation of an original single base 4a, resulting in a final form as shown in FIG. 11.

Experience has shown an improved behaviour of the clip 1 when there is a certain relative inclination between the joining bridges 41, 42 such that the support surface 41a, 42a of the joining bridges 41, 42 determine a support, interrupted by the separation of the joining bridges, concave with respect to the inside of the clip 1. This concavity (with a radius r in FIG. 4b) favours the tightening of the casing and the accumulation of the same in the opening 44, forming one or several folds, which contribute to improving the anti-slip effect of the clip, as shown in FIG. 5.

In fact, between the joining bridges 41 and 42, one or several creases or folds of the casing are able to be partially housed by the clip crimping said casing, which produces a locking effect of the clip that is not produced with clips obtained by a concatenation like the one shown in FIGS. 1a to 1c, representative of the state of the art.

In some cases, the opening 44 further allows for an escape of possible lubricants of some casings that are detrimental to the anti-slip features of the clips. In a clip according to the invention, with the base area 4 divided so as to determine in the same two or more spaced apart joining bridges 41, 42 between the legs, the casing is squeezed, able to cause a better grip of the joining bridges 41, 42 on the casing, according to the nature of the casing and of the lubricants.

Comparative tests carried out between clips obtained from a concatenation 99 representative of the state of the art and clips obtained from a concatenation 100 exemplifying the present invention prove that the latter withstand a force 15% greater before slipping and disabling the seal of a standard casing.

These data are obtained from performing tests of tensile strength, in which the clips in the study are applied on the same type of casing, specifically a plastic casing with a diameter of 80 mm, and more specifically, obtained from the supplier Walsroder®, the yellow gold Kflex model, with a thickness of 0.4 mm, the tail of which is cut flush with the clip, specifically at less than 1 mm, in order to prevent an accumulation of the same from contributing to retaining the clip; having retained one free end of the casing and stretched the clip by means of a head 12 of a J.BOT S.A. tensile testing device, model 8511, all of which is schematically shown in FIG. 3a.

TABLE 1

Comparison of the median maximum slip resistance between a conventional clip model (FIGS. 1a to 1c) and an exemplified clip of the invention (FIGS. 2a to 2c).

| Clip type | Median maximum slip resistance (Kp) |
|---|---|
| Conventional | 15.28 |
| Representative of the invention | 17.88 |

Figure 3B:
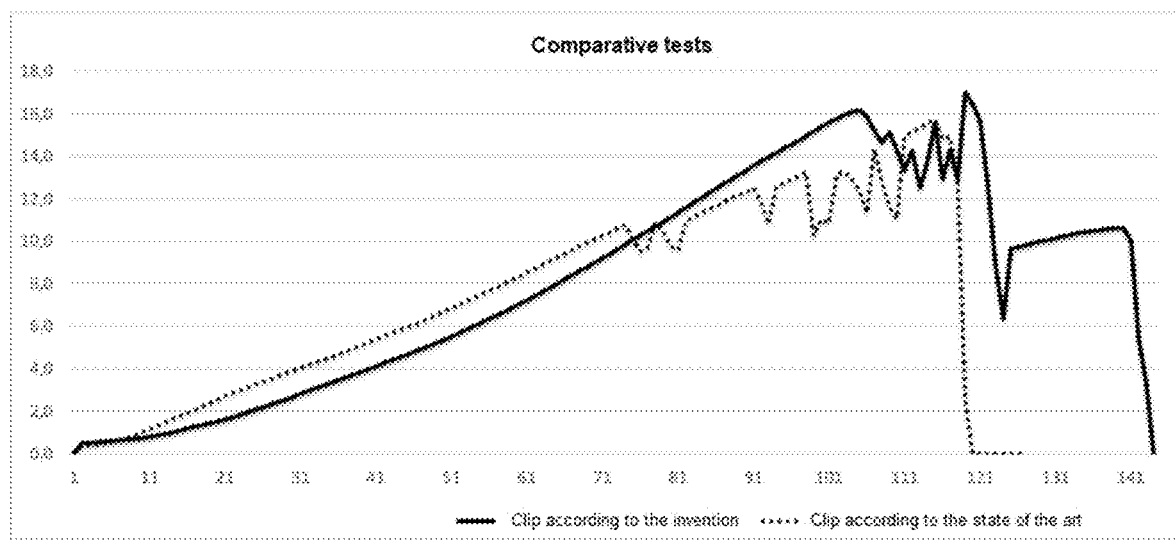
FIG. 3b graphically shows the results obtained from carrying out several comparative tests to determine the resistance to slippage between the exemplary clip of the current state of the art and the clip according to the first variant of the invention.

The different behaviour of the clips tested is also observed in the summary chart of the tests carried out, shown in FIG. 3b. This chart shows the average movement of the head based on the tensile strength applied, for the two types of clip.

For example, it is observed that the average is already affected starting at 10 Kp for conventional clips, a value at which some clips of this type slipped out of the casing; while the average is not affected until a value greater than 16 Kp for clips according to the invention, since no clip tested slipped out below this tensile value.

Likewise, while no clip of the first type, meaning the conventional type clip, reached values greater than 16.65 Kp, this value was exceeded by a significant number of clips according to the invention, with one even exceeding the value of 21 Kp.

After 20 tests, while the average tensile strength value for clips according to the state of the art is 15.28 Kp, the average value for clips according to the invention was established at 17.88 Kp. This represents the previously mentioned 15% improvement.

The previously mentioned effects of improvement to slip resistance for a better grip by the clips are obtainable by clip configurations that are different from the one exemplified by the invention in FIGS. 2a to 2c.

The dimensions of the openings will depend on the dimensions of the clip, which, in turn, is a function of the amount of material to be clamped by the clip, and also based on other aspects, such as the thickness of the casing or the expansive pressure exerted by the content sealed in the casing. For finer casings, less width or separation between the joining bridges will be necessary for the clip to make use of the improved technique thereof. With regard to the length dimension of the opening or openings, it is preferred that the same extend throughout the entire length of the base area of the clip, and more preferably that it extend also at least partially throughout the curved transition zones between the base and the legs.

On the other hand, the invention envisages that the base area of the clip is machined so as to provide the same with more than two joining bridges, able to vary the step or steps that provide the openings 44 that separate said joining bridges. The selection of the profile and the number of tools used for example in an operation of division such as the one schematically referred to in FIG. 6a will determine the number and configuration of the joining bridges and in turn of the openings 44 defined by the separation thereof.

Figure 7:
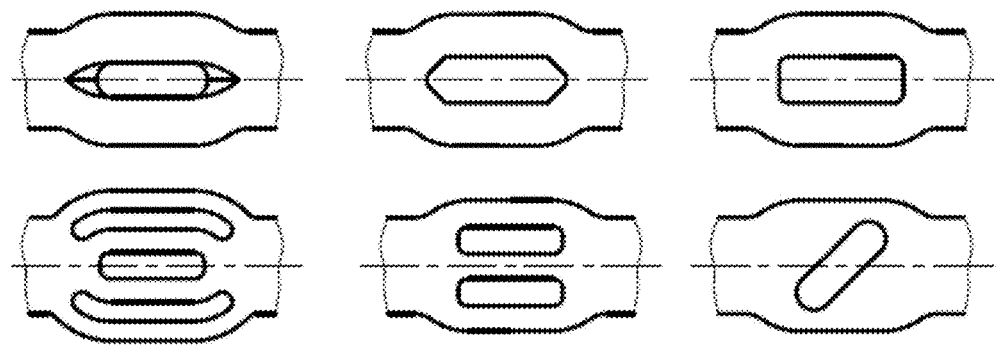
FIG. 7 schematically illustrates a plan view of other embodiments conceived by the present invention, with regard to the base area.

By way of mere example, FIG. 7 shows several options covered by the present invention, by means of different plan views of the base area of several clips.

Figure 8:
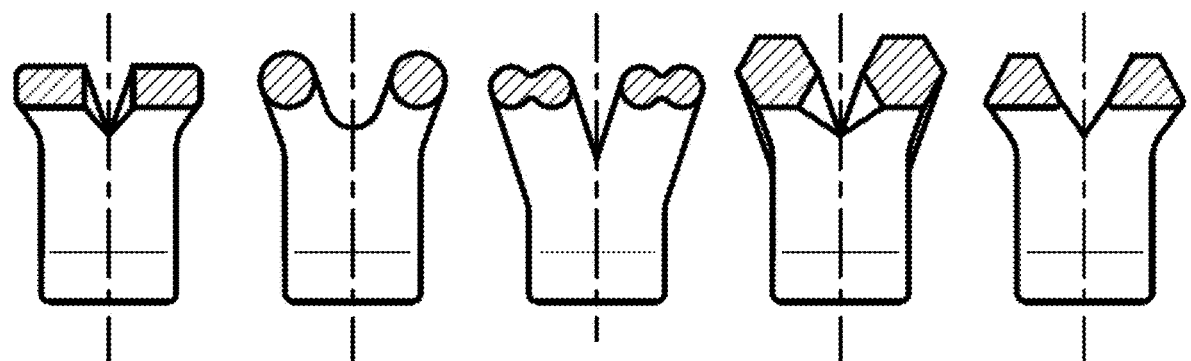
FIG. 8 schematically illustrates a cross-sectional view according to a transverse cross section plane of the clip in other embodiments conceived by the present invention, with regard to the base.

By way of example, FIG. 8 shows several options also covered by the present invention, by means of different plan views according to a transverse cross section of the clips coinciding with the base area thereof. The variants of this FIG. 8 are different to one another by the contour of the joining bridges, specifically of the transverse cross section thereof, which can be polygonal or curved.

Figure 9:
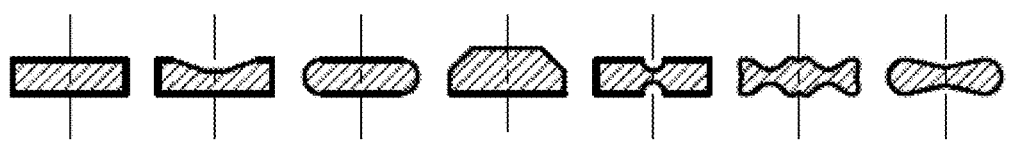
FIG. 9 schematically illustrates several transverse cross sections conceived by the present invention, with regard to the legs.

By way of example, FIG. 9 shows several options also covered by the present invention, by means of different plan views according to a transverse cross section of the clips coinciding with one of the legs thereof. The variants of this FIG. 9 are different from one another by the contour of the legs of the clip, specifically the transverse cross section thereof, which can be polygonal or curved or mixed.

Figure 10:
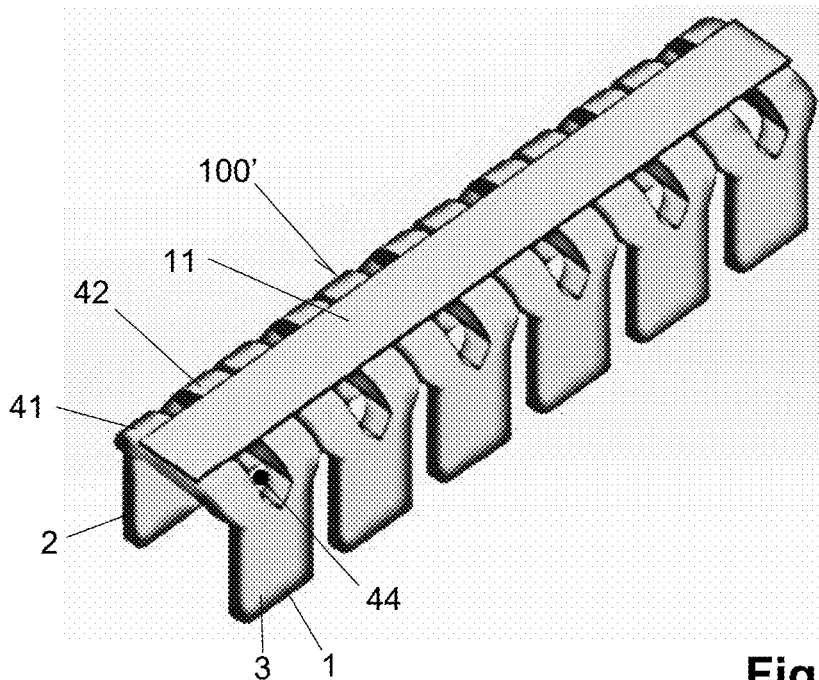
FIG. 10 schematically illustrates a strip of clips according to the invention, in this case said clips juxtaposed at the bridge thereof and linked to each other in a separable way by means of a fastening element or fastening means that are flexible and able to be cut by a shear.

In a different way to that shown in FIGS. 2a to 2c, the clips according to the invention can also be supplied in a strip 100' of individual clips temporarily fastened by a flexible fastening element or fastening means 11 that can be easily cut by a shear, said element or fastening means extending along the strip over the base area of the clips, as shown by FIG. 10. Note that in this case the distal ends of the legs 2, 3 are not angled in an opposite fashion determining connection extensions given that the clips are not concatenated, in the way in which they are in FIG. 2a.

FIG. 11 shows a clip 1 of a strip of clips of FIG. 10 seen in a plan view. In this example, shape of the opening 44 is similar to the shape taken by the clip of the example of FIG. 4a.

The invention claimed is:

1. A clip that is suitable for the constriction of sausage casings, the clip having a general U-shaped configuration comprising two facing legs that are bent with respect to a base of the clip, wherein said base of the clip is divided so as to determine in the same two or more joining bridges between the legs, these joining bridges are spaced apart and the ends thereof converge at the aforementioned legs, so that between the said bridges one or several creases or folds of the casing can be at least partially housed when the clip tightly clasps around said casing;
   wherein the clip is metal, the joining bridges have been formed by the splitting or mechanical separation of a single original base of the clip, allowing at least a punch tool in the shape of a wedge to be able to penetrate the material of which the aforementioned original single base of the clip is made up, dividing it and separating portions of the base so as to determine the joining bridges to both sides of the punch tool, the base of the clip expanding as a result thereof in relation to the original single base; and
   wherein in the splitting of the original single base, penetration is made in the original single base by a first and a second punch tool, each one from one of the faces of the aforementioned single base, the inner face aimed towards the legs and the outer face aimed towards the outside, preventing raised material or the formation of burrs which project from said faces towards the inside and towards the outside of the clip, respectively.

2. The clip according to claim 1, wherein the legs have a straight main portion, each one of said portions connected to the base of the clip by means of a curved transition zone, and wherein the separation between the joining bridges extends throughout the entire base of the clip and at least partially also through said curved transition zones.

3. The clip according to claim 1, wherein the separation between two joining bridges has a width dimension, along at least half of the length thereof, from 0.1 mm to 2.5 mm.

4. The clip according to claim 1, wherein the space that separates two joining bridges defines an opening in the base with an essentially rectangular contour, with the longer sides being parallel and the smaller sides in a circumferential arc and convex towards the inside of the aforementioned opening.

5. The clip according to claim 4, wherein the opening has a width dimension from 0.1 mm to 2.5 mm.

6. A concatenation of clips according to claim 1, formed by the joining without interruption of the aforementioned clips, each clip being joined to a clip that is immediately before it and to a clip that is immediately after it by connection extensions formed on the distal ends of the legs, aimed toward the outside of the clip and forming an angle with respect to the main direction of said legs.

7. A strip of clips according to claim 1, which comprises a succession of said clips juxtaposed at the bridge thereof and linked to each other in a separable way by means of a fastening element or fastening means that are flexible and able to be cut by a shear.

8. A clip that is suitable for the constriction of sausage casings, the clip having a general U-shaped configuration comprising two facing legs that are bent with respect to a base of the clip, wherein said base of the clip is divided so as to determine in the same two or more joining bridges between the legs, these joining bridges are spaced apart and the ends thereof converge at the aforementioned legs, so that between the said bridges one or several creases or folds of the casing can be at least partially housed when the clip tightly clasps around said casing;
   wherein the clip is metal, the joining bridges have been formed by the splitting or mechanical separation of a single original base of the clip, allowing at least a punch tool in the shape of a wedge to be able to penetrate the material of which the aforementioned original single base of the clip is made up, dividing it and separating portions of the base so as to determine the joining bridges to both sides of the punch tool, the base of the clip expanding as a result thereof in relation to the original single base;
   wherein each joining bridge, on the inner face thereof aimed towards the legs of the clip, determines a support surface intended to be applied against the casing during the use of the clip, these support surfaces of each bridge not being coplanar with one another due to the effect of separation produced by the penetration of the tool or, if applicable, punch tools used to form these joining bridges; and
   wherein the support surfaces of the joining bridges determine a support, interrupted by the separation between the joining bridges, concave with respect to the inside of the clip.

9. The clip according to claim 8, wherein the legs have a straight main portion, each one of said portions connected to the base of the clip by means of a curved transition zone, and wherein the separation between the joining bridges extends throughout the entire base of the clip and at least partially also through said curved transition zones.

10. The clip according to claim 8, wherein the separation between two joining bridges has a width dimension, along at least half of the length thereof, from 0.1 mm to 2.5 mm.

11. The clip according to claim 8, wherein the space that separates two joining bridges defines an opening in the base with an essentially rectangular contour, with the longer sides being parallel and the smaller sides in a circumferential arc and convex towards the inside of the aforementioned opening.

12. The clip according to claim 11, wherein the opening has a width dimension from 0.1 mm to 2.5 mm.

13. A concatenation of clips according to claim 8, formed by the joining without interruption of the aforementioned clips, each clip being joined to a clip that is immediately before it and to a clip that is immediately after it by connection extensions formed on the distal ends of the legs, aimed toward the outside of the clip and forming an angle with respect to the main direction of said legs.

14. A strip of clips according to claim 8, which comprises a succession of said clips juxtaposed at the bridge thereof and linked to each other in a separable way by means of a fastening element or fastening means that are flexible and able to be cut by a shear.

\* \* \* \* \*